United States Patent

[11] 3,563,162

| [72] | Inventor | Joe B. Monroe<br>Box 278, Cherokee, Okla. 73728 |
|---|---|---|
| [21] | Appl. No. | 826,450 |
| [22] | Filed | May 21, 1969 |
| [45] | Patented | Feb. 16, 1971 |

[54] BALE WAGON INCLUDING A BINDER ASSEMBLY
27 Claims, 14 Drawing Figs.

[52] U.S. Cl. .................................................. 100/7;
100/17; 214/6; 214/42
[51] Int. Cl. .................................................. B65b 13/18
[50] Field of Search .......................................... 214/42, 6B;
100/7, 1, 2, 17, 32

[56] References Cited
UNITED STATES PATENTS

| 886,048 | 4/1908 | Flynn | 100/17 |
| 2,634,003 | 4/1953 | Williamson et al. | 214/42 |
| 2,792,136 | 5/1957 | Abbott | 214/42X |
| 2,917,991 | 12/1959 | Segur | 100/7 |
| 3,289,859 | 12/1966 | Tarbox | 214/6 |
| 3,373,882 | 3/1968 | Forest | 214/6 |
| 3,414,139 | 12/1968 | Strommen | 214/6 |
| 3,467,265 | 9/1969 | Miskin et al. | 214/42 |

Primary Examiner—Billy J. Wilhite
Attorney—Dunlap, Laney, Hessin & Dougherty

ABSTRACT: A bale wagon for transporting, loading, and unloading a stack of bales, having a binder assembly thereon to secure a layer of bales into position, prior to the formation of a stack of bales, thereby providing a more stable and secure stack of bales, and having a stack-retrieving assembly to more efficiently and effectively load and unload a stack of bales.

INVENTOR
JOE B. MONROE

INVENTOR
JOE B. MONROE

INVENTOR
JOE B. MONROE
ATTORNEYS

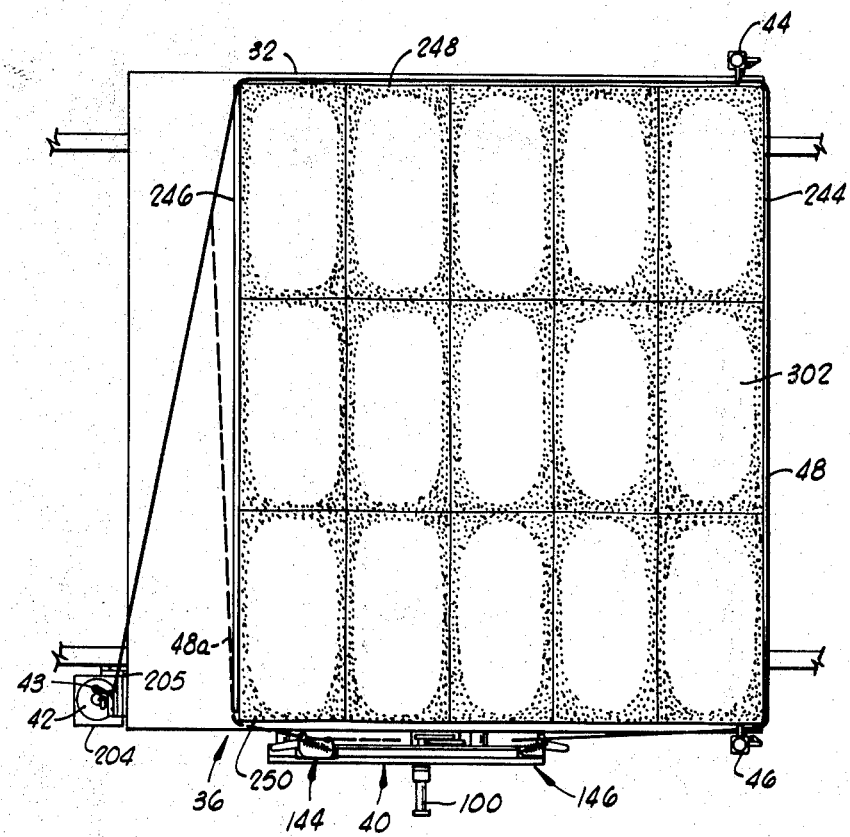
Fig. 14
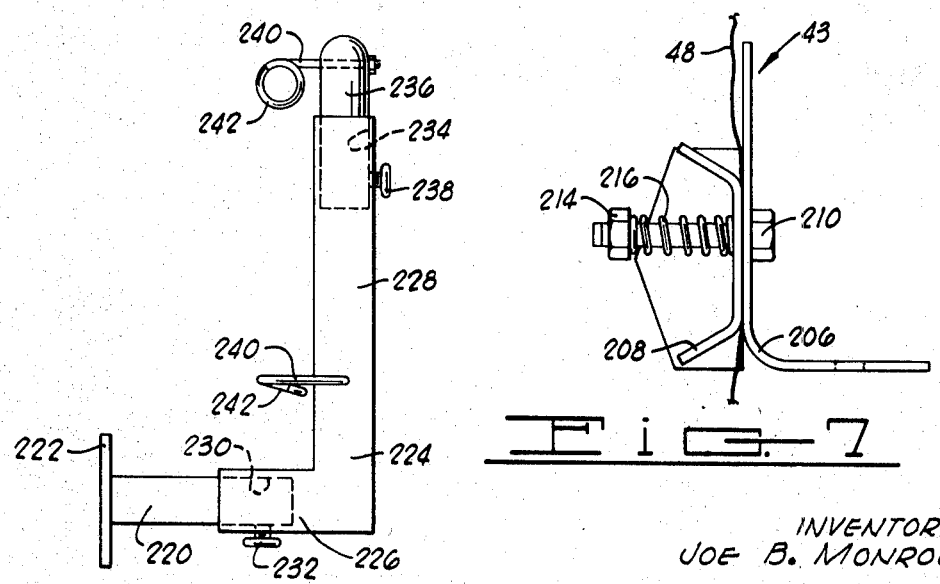
Fig. 8
Fig. 7
INVENTOR
JOE B. MONROE

INVENTOR
JOE B. MONROE
BY
Dunlap, Jenny, Hessin & Dougherty
ATTORNEYS

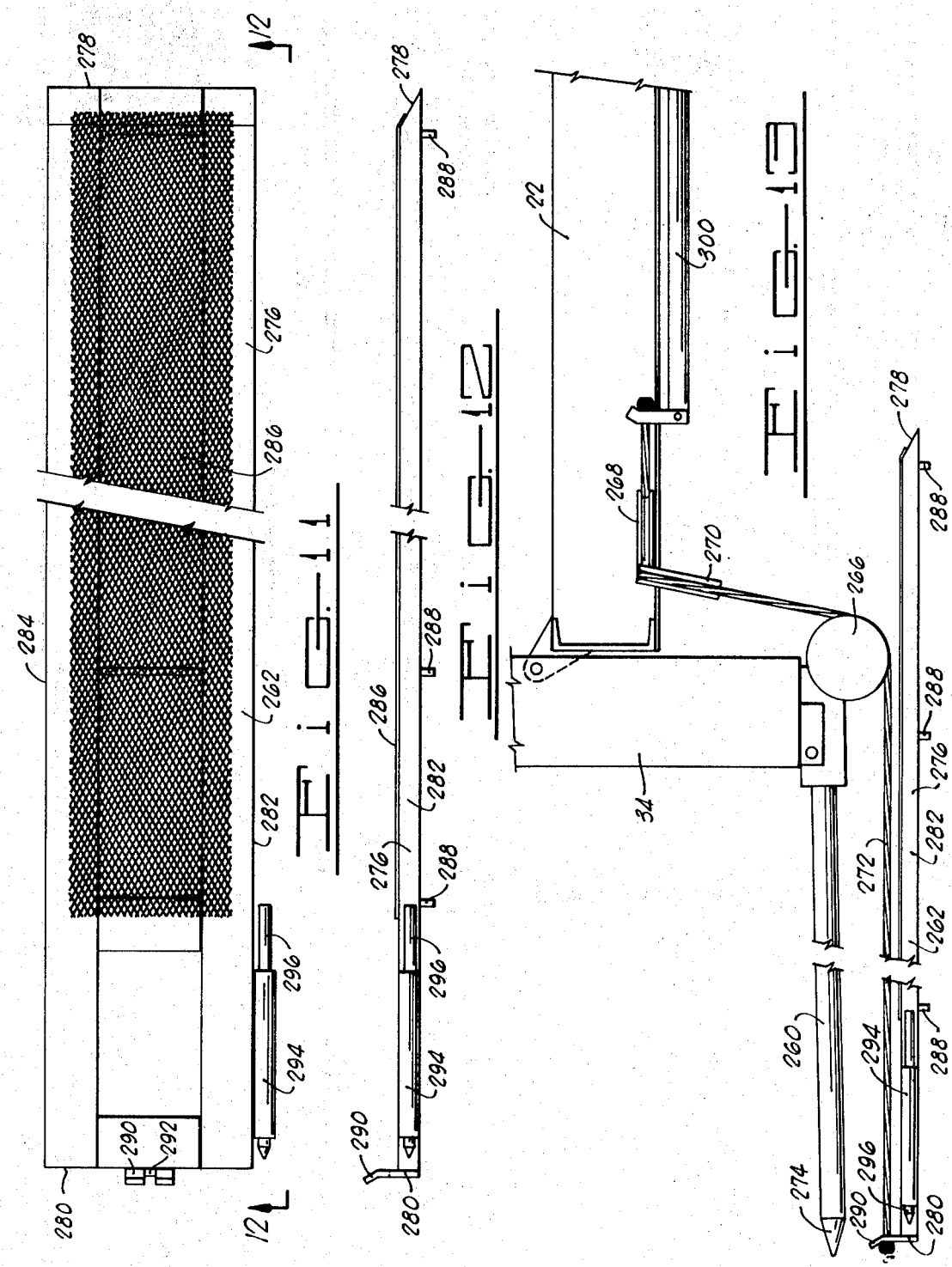

BALE WAGON INCLUDING A BINDER ASSEMBLY

BACKGROUND OF THE INVENTION

1. Field of the Invention

This invention relates generally to improvements in bale wagons, and more particularly, but not by way of limitation, to a bale wagon having an improved stacking, loading, and unloading means thereon.

2. Description of the Prior Art

In the past there have been bale wagons designed to pick up bales of hay or the like from a field, and to position them upon a table provided thereon, in stacks of varying sizes depending on the size of the particular bale wagon. One problem which existed with such bale wagon has been to provide a stack of bales, which was secure and stable. It has been found that as the number of bales in a particular stack increases, the unstableness of the stack of bales presented serious problems as far as storage and handling were concerned.

One solution to this problem has been to require the operator of the bale wagon to manually shift a particular layer of bales, such that they generally transverse the remaining layers of bales in the stack. This particular procedure is well known in the art, and is commonly referred to as providing a tie-tier row. Although this method did help or tend to stablize the stack of bales to some extent, it did have the disadvantages of requiring appreciable labor and of leaving to the personal judgment of a particular operator the exact time when the tie-tier row should be introduced into the stack. It has also been found that where the surface of the land, upon which the stack was to be eventually stored, was irregular, or where the bales were inconsistent, with respect to size, weight and looseness, the tie-tier approach was inadequate to provide a stable and secure stack of bales.

A bale wagon such as generally described hereinabove also included a plurality of tines located on one end of the bale wagon. When it was desired to pick up the stack of bales and transport, or relocate same, a portion of the bale wagon including the tines, was tilted approximately 90°, and the tines were inserted under the stack of the bales. That portion of the bale wagon was then returned to its original position, carrying the stack of bales with it, and thus placing the stack of bales in position on the bale wagon for transporting same. The tines, in the past, have generally been provided to have an elongated triangular shape, in one elevation thereof. The tines were inserted lengthwise, with respect to the elongated triangular shape, under the stack of bales, as described hereinabove. Because of the particular shape of these tines, it has been found that as they are inserted under the stack of bales they would either dig into the terrain or into the bales, when used in an area having an irregular terrain, which is generally the case.

It is also apparent, that the procedure described hereinabove for loading and unloading the stack of bales, required that the surface of the ground provide sufficient traction for the wheels of the bale wagon, so that the bale wagon may be backed into the stack of bales thereby inserting the tines generally under the stack of bales. There are of course many times when the traction would not be sufficient in actual use, due to rain or snow, which resulted in a great amount of lost time and effort in trying to get the tines of the bale wagon moved generally under the stack of bales.

SUMMARY OF THE INVENTION

The present invention contemplates a bale wagon which is employed for stacking, loading and unloading bales of hay and the like, and which includes a table on which the bales are loaded in rows and moved from the front to the rear thereof to form layers of bales on the table. The layers of the bales are then moved from the table to a rack to form stacks of bales on the rack. The improvement contemplated by the present invention, includes a supply of twine, which is carried on the bale wagon adjacent the table, and means on the bale wagon for extending the twine around a layer of bales on the table as the bales are loaded on the table. A twine binder means is disposed on the wagon adjacent the table for tensioning the twine around the layer of bales on the table, whereby the layer of bales may be tightly bound together before loading on the rack. A plurality of tines are secured in spaced relation on one end of the rack and positioned to be moved under a stack of bales being loaded on the bale wagon. Guide means adapted to be positioned for supporting the bale wagon and guiding the bale wagon toward a stack of bales to be loaded thereon. Retrieving means are supported on the bale wagon. Cable means are secured between the guide means of the retrieving means on the bale wagon for pulling the bale wagon on the guide means toward a stack of bales and forcing the tines under the stack upon actuation of the retrieving means.

An object of the invention is to provide a bale wagon capable of providing a more stable and secure stack of bales.

Another object of the invention is to provide a bale wagon capable of providing a more stable and secure stack of bales, yet reducing the operator time required, and requiring less operator skill and judgment.

A further object of the invention is to provide a bale wagon capable of loading a stack of bales thereon, notwithstanding the fact that the particular terrain may be irregular, or the surface traction provided for the bale wagon is not secure.

Another object of the invention is to provide a bale wagon capable of more efficiently and economically stacking, loading, and unloading a stack of bales.

Other objects and advantages of the invention will be evident from the following detailed description, when read in conjunction with the accompanying drawings, which illustrate the various embodiments of the invention.

BRIEF DESCRIPTION OF THE DRAWING

FIG. 7 is an enlarged view of a twine tension plate.

FIG. 8 is an enlarged view of a typical guide eyelet assembly.

FIG. 11 is a top elevation of a track assembly.

FIG. 12 is a view of the track assembly of FIG. 11 taken substantially along the lines 12—12 of FIG. 11.

FIG. 13 is a side elevation of a portion of a stack-retrieving assembly illustrating the orientation of the pulley wheels therein.

FIG. 14 i a view similar to FIG. 4 but illustrating that portion of the bale wagon with a layer of bales positioned thereon.

DESCRIPTION OF THE PREFERRED EMBODIMENT

Figure 1:
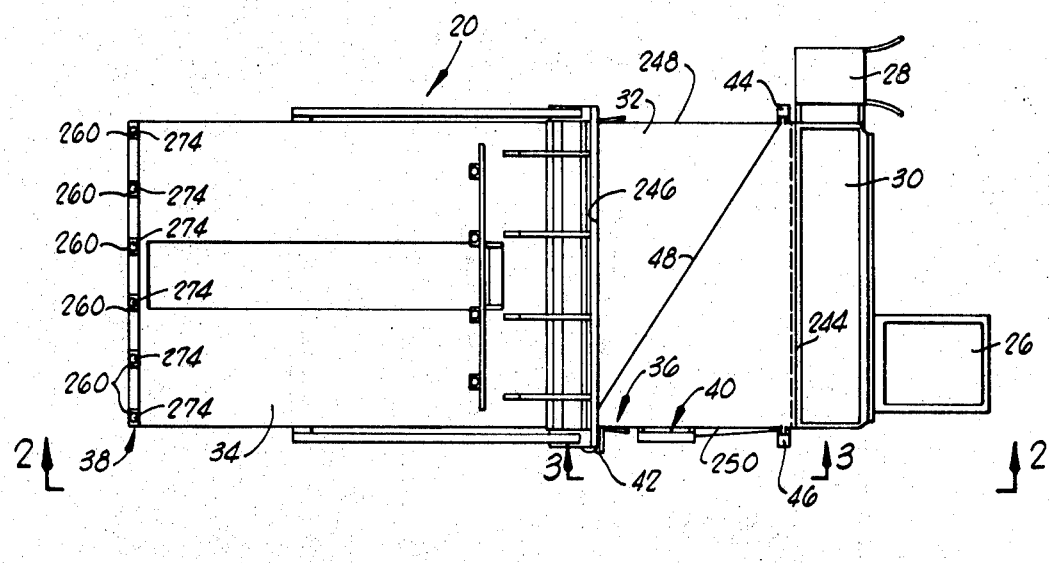
FIG. 1 is a top view of a bale wagon.
Figure 2:
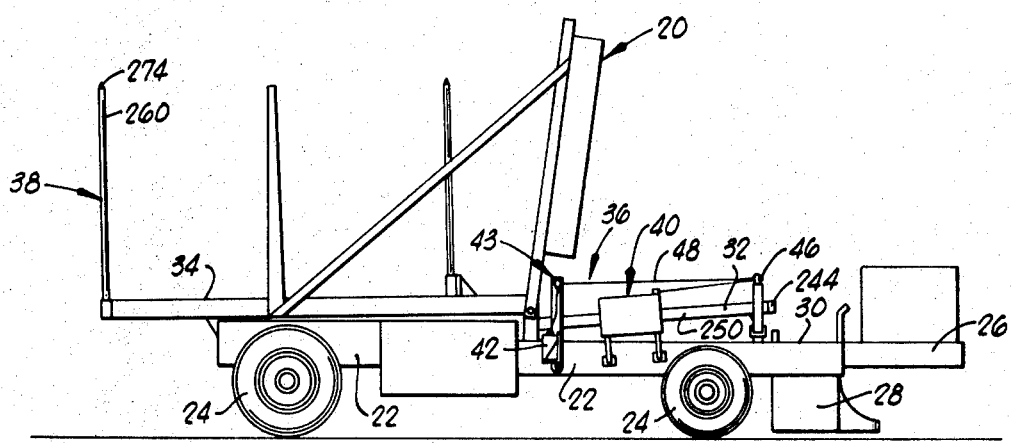
FIG. 2 is a view of the bale wagon of FIG. 1, taken substantially along the lines 2—2 of FIG. 1.

Referring to the drawings in detail, and to FIGS. 1 and 2 in particular, shown therein and designated by general reference character 20 is a bale wagon constructed in accordance with the invention.

The bale wagon 20, as shown in FIGS. 1 and 2, basically comprises: a frame 22 supported by a plurality of wheels 24; an operator cab 26, which is secured to the frame 22; a bale chute assembly 28, which is also secured to the frame 22; and, a conveyor type platform 30, a table 32, and a rack 34, all of which are supported by the frame 22. A bale wagon, having the basic components as described hereinabove is commercially available from such farm machinery manufacturers as, for example, New Holland, Pa., and therefore no further detailed description is required herein.

The bale wagon 20, as shown in FIGS. 1 and 2, is also provided with the improvements contemplated by the present invention, in particular a banding assembly designated by the general reference character 36, and a stack-retrieving assembly designated by the general reference character 38, both of which will be described in detail hereinafter.

Figure 3:
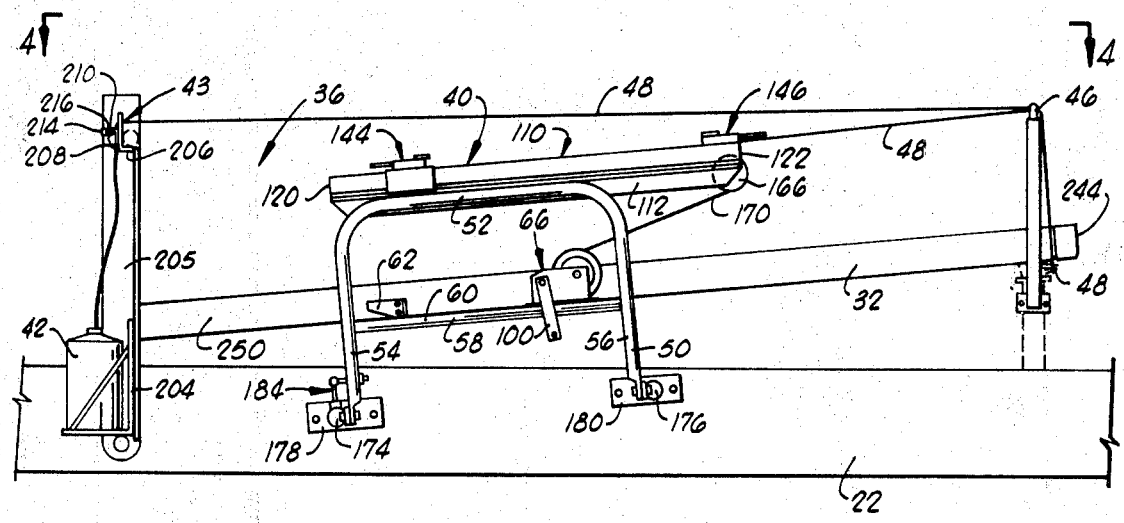
FIG. 3 is an enlarged view of a portion of the bale wagon taken substantially along the lines 3—3 of FIG. 1.
Figure 4:
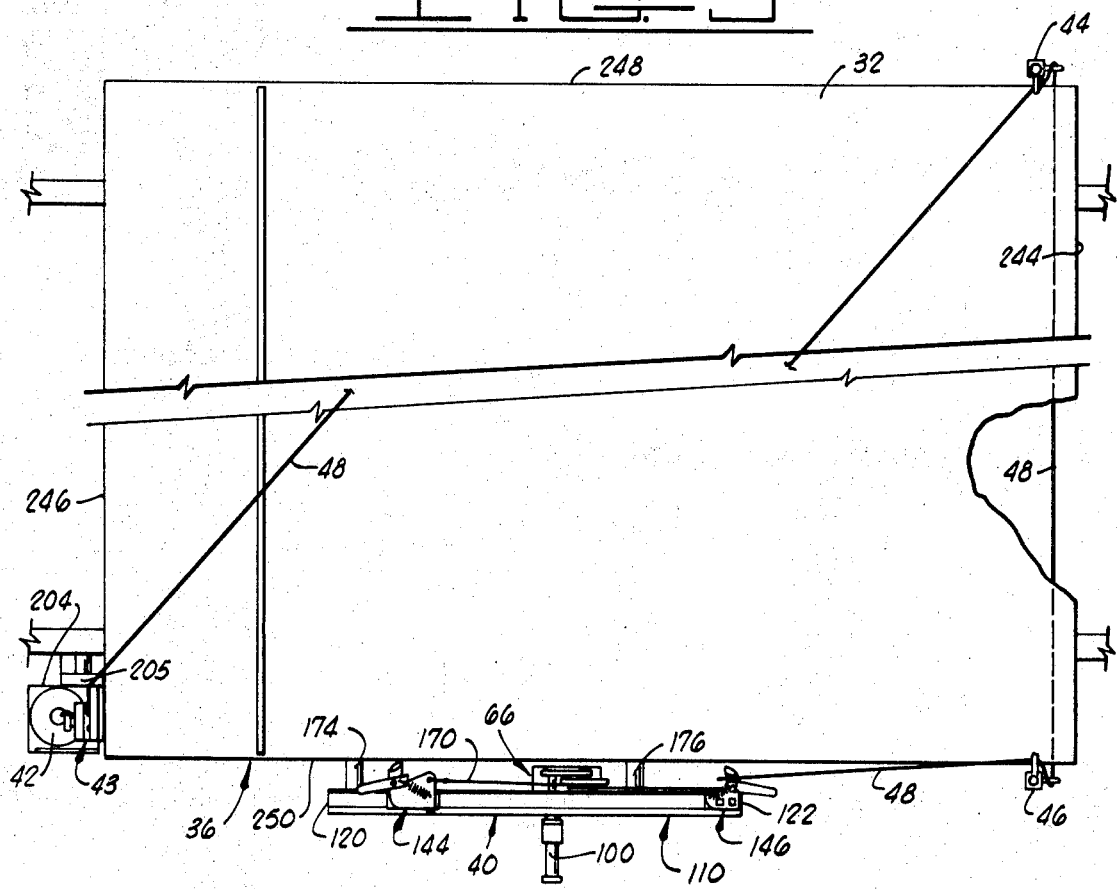
FIG. 4 is an enlarged view similar to FIG. 3 but taken substantially along the lines 4—4 of FIG. 3.

The banding assembly 36 generally comprises: a twine binder assembly 40, a twine canister 42, a twine tension plate 43, a pair of twine guides 44 and 46, and a twine 48. The twine binder assembly 40, as shown in FIGS. 3 and 4, is secured to the frame 22 of the bale wagon 20 in a manner to be more fully described hereinafter, and is generally disposed at an angle with respect to the frame 22, so that the general elevation of the twine binder assembly 40 corresponds to the general elevation of the table 32.

Figure 5:
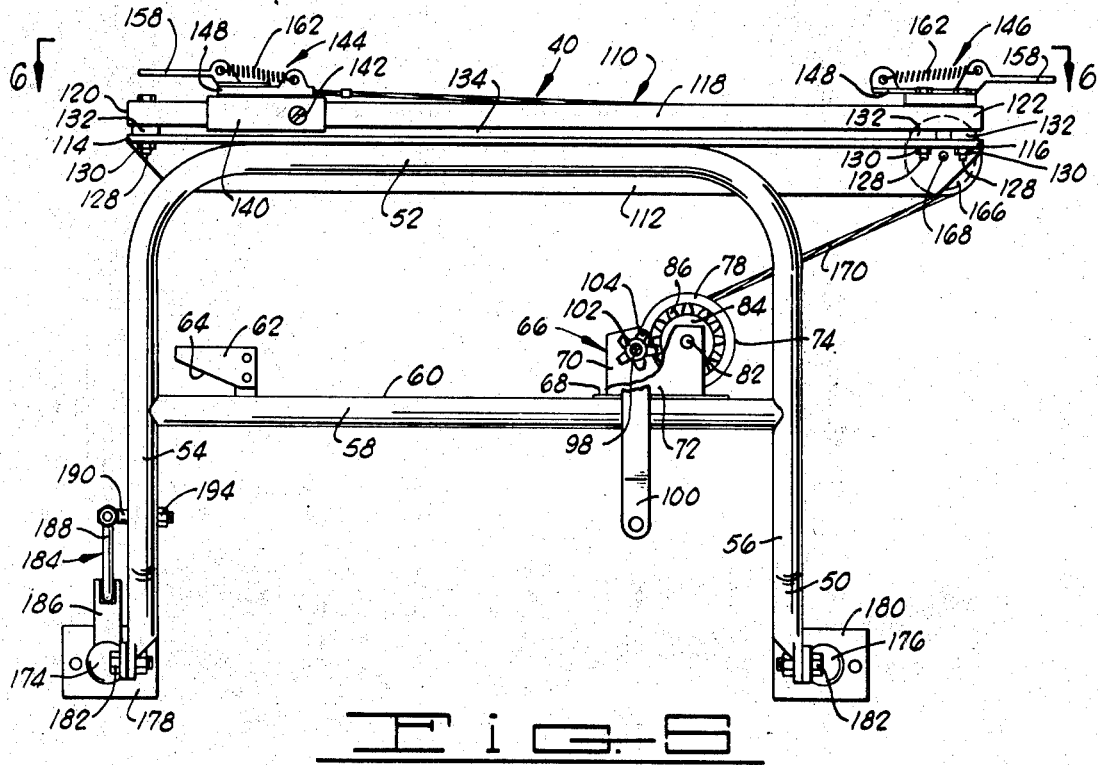
FIG. 5 is an enlarged view of a twine binder assembly.
Figure 6:
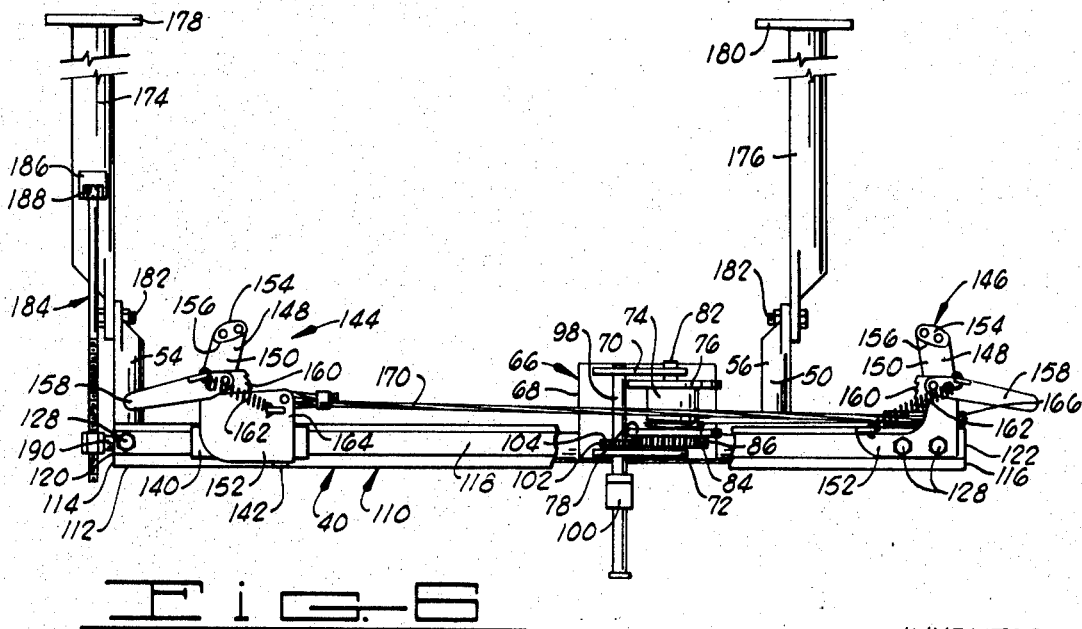
FIG. 6 is an enlarged view of the twine binder assembly of FIG. 5, taken substantially along the lines 6—6 of FIG. 5.

The twine binder assembly 40, as shown more clearly in FIGS. 5 and 6, includes a generally U-shaped frame 50 having an upper portion 52 and legs 54 and 56. In a preferred form, the frame 50 is constructed of a section of a pipe, of a size depending upon the size and strength requirements of the particular twine binder assembly being constructed. A bar 58 is extended across the U-shape frame 50 and secured at its opposite ends to the legs 54 and 56. In a preferred form, the bar 58 is constructed from a U-shaped channel or a bar, having a substantially flat surface on the upper side 60 thereof.

A twine cutter 62 is secured to the upper surface 60, on one end portion of the bar 58. The twine cutter 62 has a lower inclined surface 64, which has been beveled to provide a cutting edge thereon.

A winch assembly 66 is disposed on the upper surface 60 of the bar 58, and is generally located on the opposite end portion of the bar 58 from the twine cutter 62. The winch assembly 66, as shown in FIGS. 5 and 6, is supported by a base 68, having opposite end plates 70 and 72 secured thereto. The end plates 70 and 72 are generally disposed parallel to each other and perpendicular to the base 68.

A generally cylindrically shaped cable winder 74, having opposite retaining plates 76 and 78 secured on the opposite ends thereof, and a shaft 82 extending therethrough, said shaft being generally secured to the cable winder 74, is generally disposed between the end plates 70 and 72. The opposite ends of the shaft 82 are journaled in the end plates 70 and 72.

A gear wheel 84, having gear teeth 86 formed around the outer periphery thereof, is mounted on, and secured to the shaft 82. The gear wheel 84 is generally disposed between the retaining plate 78 of the cable winder 74 and the end plate 72 of the base 68.

A shaft 98 is journaled in the end plates 70 and 72. A handle 100 is secured to one end of the shaft 98, and a second gear wheel 102, having gear teeth 104 formed around the outer periphery thereof, is secured to the shaft 98 generally between the end plates 70 and 72. The second gear wheel 102 is disposed and the gear teeth 104 thereof are provided, such that the gear teeth 104 will meshingly engage the gear teeth 86 of the gear wheel 84, thereby transmitting the rotational movement of the handle 100 to the cable winder 74, for reasons to be described in detail hereinafter.

A slide rail assembly 110 is supported on the twine binder assembly 40, and basically comprises an L-shaped frame 112, having a portion thereof welded or otherwise secured to the upper portion 52 of the U-shape frame 50, and having opposite ends 114 and 116 thereon. A slide rail 118, having opposite ends 120 and 122, is disposed on the L-shaped frame 112. The opposite end portions 120 and 122 of the slide rail 118 are secured to the L-shape frame 112 at the respective opposite ends thereof, 114 and 116, by a plurality of fasteners 128, which are provided to extend through the slide raid 118 and the L-shape frame 112, and are then secured on the opposite ends thereof by a plurality of nuts 130. A spacer 132 is disposed on each fastener 128, and in an assembled position, as shown more clearly in FIG. 5, the spacers 132 are generally disposed between the slide rail 118 and the L-shape frame 112, thereby providing a gap 134 therebetween, for reasons which will be made more apparent hereinafter.

A retainer 140 is secured about the slide raid 118. The retainer 140 is sized, such that it is retained on the slide rail 118 and yet is free to slide lengthwise along the slide raid 118. It is apparent from FIG. 5, that a portion of the retainer 140 is disposed in the gap 134 between the slide rail 118 and the L-shaped frame 112, and is thus free to slide therein. A screw 142 is threaded through one side of the retainer 140 and is sized to engage the slide rail 118, in one position thereof. It is apparent, that when the screw 142 is tightened to securely engage the slide rail 118, the retainer 140 will be secured in a set position with respect to the slide rail 118, for reasons to be made more apparent hereinafter.

The slide rail assembly 110 also includes a pair of jaw assemblies 144 and 146. The jaw assembly 144 is secured on the retainer 140, such that the jaw assembly 144 will slide lengthwise along the slide rail 118, following the movement of the retainer 140. The jaw assembly 146 is secured to the slide rail 118, and more particularly, the jaw assembly 146 is fastened to the slide rail 118 near the end 122 thereof by the fasteners 128, such that the jaw assembly 146 is securely held in position with respect to the slide rail 118.

Each jaw assembly 144 and 146 comprises an L-shaped support member 148, having leg portions 150 and 152 formed thereon. A clamping plate 154, having a groove 156 formed along one side thereof, is secured to the leg portion 150 of each jaw assembly 144 and 146. A handle 158, having a gripping surface 160 formed along one edge thereof, is pivotally secured on the leg portion 150 of each jaw assembly 144 and 146, and is disposed with respect to the clamping plate 154, such that in one position of the handle 158, the gripping surface 160 is pivoted into the groove 156, thereby grippingly holding the twine 48, which is disposed therebetween, as will be described in more detail hereinafter.

One end of a spring 162 is secured to the leg portion 152 of each jaw assembly 144 and 146, and the opposite end thereof is secured to the handle 158 of each jaw assembly 144 and 146. The spring 162 is sized and disposed, such that the spring 162 will bias the handle 158 and, more particularly, the gripping surface 160 thereon into a gripping position with respect to the clamping plate 154. As shown in FIGS. 5 and 6, the leg portion 152 of the jaw assembly 144 is secured to the retainer 140, and disposed in such a manner that the leg portion 150 of the jaw assembly 144 will extend generally perpendicular to the retainer 140. The leg portion 152 of the jaw assembly 146 is secured to the slide rail 118 by the fasteners 128, which extend therethrough, and the jaw assembly 146 is also disposed with respect to the slide rail 118, so that the leg portion 150 will extend generally perpendicular to the slide rail 118. The leg portion 152 of the jaw assembly 144 is provided with an additional portion 164, for reasons which will be made apparent hereinafter.

A pulley wheel 166, having a shaft 168 extending therethrough, is journaled on the L-shaped frame 112 generally near the end 116 thereof.

As shown more clearly in FIG. 6, a cable 170 is secured at one end thereof to the portion 164 of the jaw assembly 144. The cable 170 is extended over a portion of the pulley wheel 166, rotatingly engaging said pulley wheel 166, and is secured at the opposite end thereof to the cable winder 74. It is apparent, that the cable 170 is disposed such that as the cable winder 74 is rotated, thereby retrieving the cable 170, the jaw assembly 144 will be pulled along the slide rail 118 generally toward the end 116 thereof, for reasons which will be made apparent hereinafter.

Supporting members 174 and 176 for the binder assembly 40 are secured on one end thereof to flange members 178 and 180 respectively. The opposite ends of the supporting member 174 and 176 are pivotally secured to the legs 54 and 56 respectively, of the U-shape frame 50, by fasteners 182. As more clearly shown in FIG. 3, the flange members 178 and 180 are secured to the frame 22 of the bale wagon 20, thereby supporting the twine binder assembly 40 in position with respect to the bale wagon 20.

The supporting members 174 and 176 extend a distance from the frame 22 of the bale wagon 20, and are disposed to be generally perpendicular thereto. A support linkage 184 is generally disposed between the supporting member 174 and the leg 54 of the U-shape frame 50. The support linkage 184 is basically comprises: a post 186, which is secured on one end thereof to the supporting member 174; a linkage 188, pivotally secured on one end thereof to the post 186; and a linkage 190, which is pivotally secured on one end thereof to the linkage 188. The support linkage 184 is disposed such that, in an assembled position as shown in FIGS. 5 and 6, the linkage 190 will extend through an aperture formed in the leg 54 of the U-shaped frame 50. The linkage 190 is then secured on one end thereof to the leg 54 by a nut 194. It is apparent from FIGS. 5 and 6, that the support linkage 184 will secure the twine binder assembly 40 in position and prevent the U-shaped frame 50 thereof from pivoting about the connection between the legs 54 and 56 and the supporting members 174 and 176 respectively. It is also apparent that when linkage 190 is removed from engagement with the leg 54, that the twine binder assembly 40 will be free to pivot about the connections between the legs 54 and 56 and the supporting members 174 and 176 respectively, for reasons to be described hereinafter.

The twine canister 42, shown more clearly in FIGS. 3 and 4, is a cylindrically shaped container and is secured to a portion of the frame 22 of the bale wagon 20 by a brace member 204. The brace member 204 is supported by a post 205, which extends generally perpendicular from the frame 22 and is secured thereto. The twine canister 42 is provided and sized to hole a supply of the twine 48.

The twine tension plate 43, as shown in FIGS. 3 and 4 and more clearly in FIG. 7, is disposed generally above the twine canister 42, and basically comprises an L-shaped bracket support 206, which is secured on one end thereof to the post 205, and a plate 208, which in an assembled position, is disposed such that one surface thereof is in engagement with a portion of the L-shape support bracket 206. A bolt 210 extends through the L-shape support bracket 206 and the plate 208, and has a nut 214 secured on one end thereof. A spring 216 is telescoped over the bolt 210 between the nut 214 and the plate 208. The spring 216 is sized and disposed such that, in an assembled position, as shown in FIG. 7, the spring 216 biases the plate 208 into engagement with a portion of the L-shaped support bracket 206, thereby tensionally holding a portion of the twine 48 therebetween.

In a preferred form, the twine guides 44 and 46, shown in FIGS. 1 and 2, are constructed exactly alike and, as shown more clearly in FIG. 8, basically comprise an arm 220, having a flanged end 222 thereon. Each flanged end 222 is secured to the frame 22 of the bale wagon 20 and is provided to extend a distance generally perpendicular thereto. A generally L-shaped support member 224, having legs 226 and 228, is secured to each arm 220. In a preferred form, each leg 226 is provided with a hollow portion 230 extending a distance through the end thereof, and sized to slidingly receive the respective arm 220. In an assembled position, each arm 220 is generally disposed in the respective hollow portion 230 of leg 226, and a screw 232 is threadedly extended through a portion of each leg 226 and is disposed to engage the respective arm 220, thereby securing each arm 220 and each L-shaped support member 224 respectively, in position with respect to the frame 22 of the bale wagon 20. It is apparent that the distance which each L-shape support member 224 extends from the frame 22 is thereby adjustable, depending on the distance which the arm 220 is extended into the hollow portion 230 of the leg 226.

Each leg 228 is also provided with a hollow portion 234 in the end thereof, similar to the hollow portion 230 in each leg 226. Each hollow portion 230 is sized to slidingly receive a post 236. A screw 238 is threadedly extended through a portion of each leg 228 and is disposed to engage the respective post 236. It is apparent that the distance which the post 236 will extend from the leg 228 is adjustable in a manner similar to that previously described with respect to each arm 220 and each leg 226.

A pair of guide eyelets 240, having a hook portion 242, are disposed on each of the twine guides 44 and 46. One of the guide eyelets 240 is secured to each post 236, and the other guide eyelet 240 is secured to each leg 228 of the L-shape support member 224. As shown more clearly in FIG. 8, the guide eyelets 240 are provided to extend generally perpendicular to the leg 228 and are oriented generally axially about the leg 228 to be approximately 180° apart.

As shown in FIGS. 1 and 4, the table 32 is provided with a front end 244, which is generally adjacent the conveyor type platform 30; a rear end 246, which is generally adjacent the rack 34; and sides 248 and 250 thereon. The twine canister 42 is generally disposed adjacent the rear end 246, near the side portion 250 of the table 32. The twine guide 44 is disposed generally adjacent the side 248 and near the front end 244 of the table 32. Twine guide 46 is disposed generally adjacent the side 250 and near the front end 244 of the table 32. The twine binder assembly 40 is disposed generally adjacent the side 250 and near the rear end 246 of the table 32. The purpose of the particular orientation of the twine canister 42, the twine guides 44 and 46, and the twine binder assembly 40, with respect to the table 32, will be made more apparent hereinafter.

As shown more clearly in FIGS. 3 and 4, one end of the twine 48 is extended from the twine canister 42 through the twine tension plate 43 (FIG. 7), generally between the plate 208 and the L-shape support bracket 206 thereon. It is apparent from FIG. 7, that since the plate 208 is biased by the spring 216 into engagement with the L-shape support bracket 206, the twine 48 positioned therebetween will be tensionally held thereby preventing any excess slippage of the twine 48 during the operation of the banding assembly 36, as will be described hereinafter.

The twine 48 is then extended generally diagonally across the table 32 to the twine guide 44. The twine 48 is extended through the hook 242, which is secured to the post 236, and then generally downwardly along the leg 228 of the L-shaped support member 224 through the lower hook 242. The twine 48 extends from the guide 44 under the table 32 to the twine guide 46. The twine 48 is then extended through the hook 242, which is secured to the leg 228 of the twine guide 46, and extended generally upwardly along the leg 228 through the hook 242, which is attached to the post 236, thereof. The twine 48 is then extended generally along the side 250 of the table 32 to the twine binder assembly 40. The end portion of the twine 48 is disposed in the groove 156 of the jaw assembly 146, and the handle 158 is then moved in a direction bringing the gripping surface 160 into engagement with the twine 48, thereby grippingly holding the twine 48 between the gripping surface 160 and the groove 156. The twine 48 is held securely by the jaw assembly 146 at a point such that one end of the twine 48 will loosely extend a distance beyond the jaw assembly 146.

STACK-RETRIEVING ASSEMBLY

Figure 9:
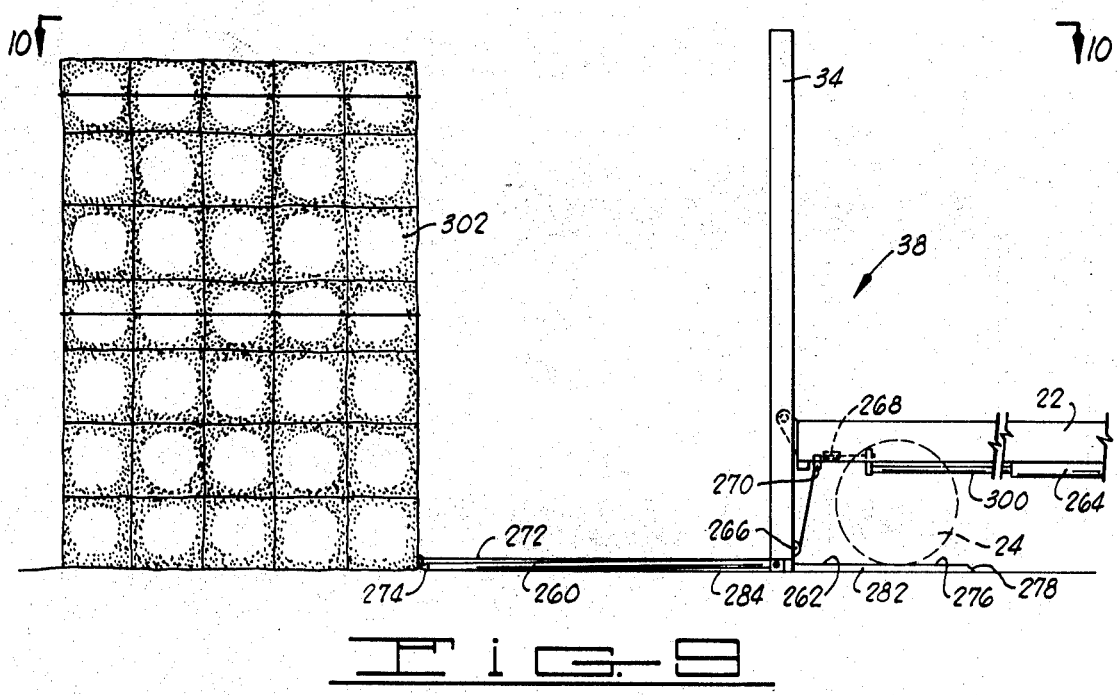
FIG. 9 is a side elevation illustrating the stack-retrieving assembly in one position thereof with respect to a stack of bales.
Figure 10:
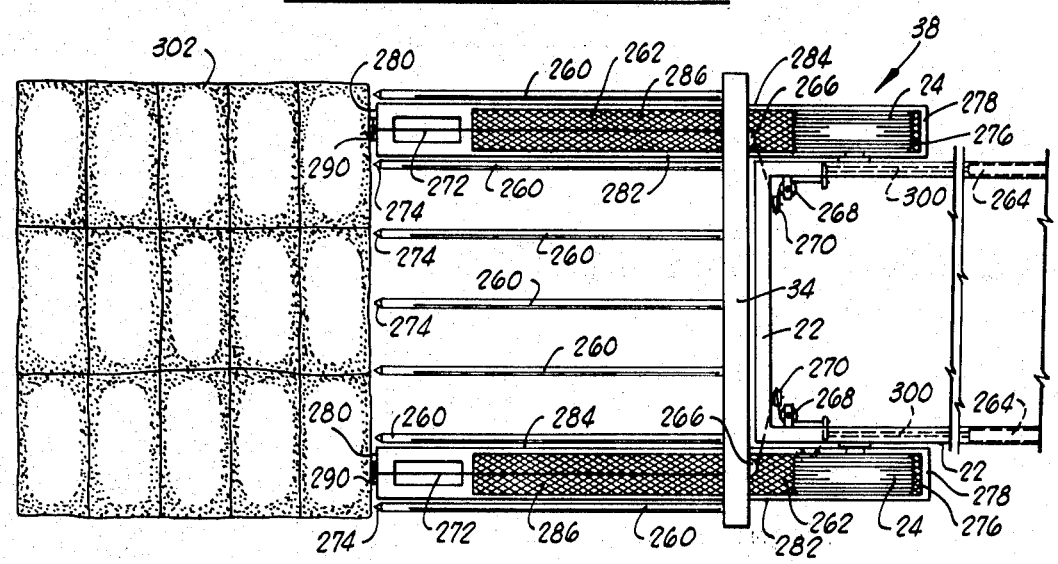
FIG. 10 is a view of the stack-retrieving assembly of FIG. 9 taken substantially along the lines 10—10 of FIG. 9.

The rack 34 of the stack-retrieving assembly, as shown in FIGS. 9 and 10, has been moved to a position wherein the rack 34 is oriented generally perpendicular to the frame 22, adjacent one end thereof, for purposes of clarity of description. The stack-retrieving assembly 38 basically comprises: a plurality of tines 260, a pair of track assemblies 262, a pair of hydraulic cylinders 264, a pair of pulley wheels 266, a pair of pulley wheels 268, a pair of pulley wheels 270, and a cable 272.

The tines 260 extend generally perpendicular to the rack 34, and are disposed on one end thereof. One end of each tine 260 is secured to the rack 34 and the opposite end 274 thereof has a generally conical shape for reasons to be made more apparent hereinafter.

As shown more clearly in FIGS. 11 and 12, each track assembly 262 basically comprises: a support member 276, having opposite ends 278 and 280, and opposite sides 282 and 284 thereon. A wire mesh grid 286 is secured to one surface of the support member 276 and extends generally between the ends 278 and 280 thereof.

As shown more clearly in FIG. 12, a plurality of post members 288 are secured to the surface of each support member 276 opposite the surface on which the wire mesh grid 286 is secured. The post members 288 extend generally between the sides 282 and 284 of each support member 276 and are provided to extend generally perpendicular thereto, for reasons which will be made hereinafter. A bracket 290, having a slot 292 formed in one end thereof is secured to the end 280 of each support member 276. A hollow shaft 294 is secured to the side 282 of each support member 276 and a positioning pin 296 is slidingly disposed in the hollow portion of the shaft 294.

Each track assembly 262 is sized and disposed with respect to the bale wagon 20 to accommodate the wheels 24 thereon, during the stack-retrieving operation, which will be described in more detail hereinafter.

Each hydraulic cylinder 264 (FIGS. 9 and 10) is secured to the frame 22 of the bale wagon 20, and the hydraulic cylinders 264 are oriented with respect to each other to be on opposite sides of the frame 22. Each hydraulic cylinder 264 is provided with a shaft 300 which will extend a distance therefrom when the hydraulic cylinder 264 is actuated. As shown in FIGS. 9 and 10, each shaft 300 has been extended the full distance from its respective hydraulic cylinder 264.

Each pulley wheel 268 is rotatingly secured to the frame 22 of the bale wagon 20, and is generally oriented to extend perpendicular to the frame 22 and in general alignment with the shaft 300 of its respective hydraulic cylinder 264. Each pulley wheel 270 is rotatingly secured to the end of the frame 22, and is generally oriented at an angle with respect to its respective pulley wheel 268. Each pulley wheel 266 is rotatingly secured to the end of the rack 34 and is generally oriented at an angle with respect to its respective pulley wheel 270. The particular orientation of the pulley wheels 266, 268, and 270 with respect to each other as shown more clearly in FIG. 13. This particular orientation of the pulley wheels 266, 268 and 270 is to properly guide the cable 272 between each hydraulic cylinder 264 and each track assembly 262, as will be described in more detail hereinafter.

As shown in FIG. 10, one end of each cable 272 is disposed in the slot 292 of each bracket 290, thereby securing said end of the cable 272 in position with respect to each track assembly 262. The cable 272 is then extended along its respective track assembly 262 and around its respective pulley wheel 266. The cable 272 is then extended around a portion of its respective pulley wheel 270 and around a portion of its respective pulley wheel 268. The opposite end of the cable 272 is then extended and secured to the end of the shaft 300 of its respective hydraulic cylinder 264.

It is apparent from FIGS. 9 and 13, that each cable 272 is so oriented with respect to its track assembly 262, pulley wheels 266 and 268 and 270, and hydraulic cylinder 264, such that when each hydraulic cylinder 264 is actuated and the shaft 300 thereof is moved or drawn into its respective hydraulic cylinder 264, the cable 272 will pull bale wagon 20 on the track assemblies 262 generally toward the ends 280 of the track assemblies 262.

It is apparent from FIG. 13 that the pulley wheels 266, 268 and 270 are oriented with respect to each other so as to guide the cables 272 into proper relationship with respect to the track assemblies 262 and hydraulic cylinders 264, and at the same time each pulley wheel cooperates with the other pulley wheels to hold the cables 272 in engagement with the respective pulleys to prevent the cables 272 from slipping off the track of any of the pulley wheels during the operation of the stack-retrieving assembly 38.

Some bale wagons of the type herein referred to are provided to include a pair of feet, which are actuated by a hydraulic cylinder means to push the bale wagon away from a stack of bales after the stack of bales has been unloaded from the wagon. A bale wagon, such as of the type available from New Holland, a division of Sperry-Rand Corp. mentioned hereinbefore, includes such feet and hydraulic cylinder means. In a bale wagon of this type the end of each cable 272 may be secured to the end of the shaft of each hydraulic cylinder means, which is also associated with the feet previously mentioned. It is apparent that in a bale wagon of this type separate hydraulic cylinder means would not be required.

OPERATION OF THE PREFERRED EMBODIMENT

Generally speaking, and with respect to one aspect of the bale wagon 20, the bale wagon 20 is used to pick up bales from a field and position the bales into a stack upon the bale wagon 20, for transporting and subsequently unloading the stack therefrom. The bale wagon 20 is normally operated by an operator who is positioned in the operator cab assembly 26, as shown in FIG. 1.

The operator will guide the bale wagon 20 across the field, such that the bales, which are located in various positions on the field, are guided into the bale chute assembly 28. The bale chute assembly 28 will lift the bales from the field and guide the bales onto the conveyor type platform 30.

The conveyor-type platform 30 incorporates means to position the bales thereon, so that there will be an adequate amount of space available to accept subsequent bales positioned thereon from the bale chute assembly 28. The bales are positioned on the conveyor type platform 30 until a row of bales has been positioned thereon. The number of bales which constitute a row will of course depend on the size of the particular bale wagon; however, generally speaking two or three bales will constitute a row.

When the number of bales constituting a row have been positioned on the conveyor type platform 30, a pusher (not shown) on the platform 30 is activated, and will move the entire row of bales back onto the table 32. This process of moving rows of bales onto the table 32 will be repeated until the table 32 has received a predetermined number rows of bales, the exact number of which will depend on the particular size of bale wagon.

When the predetermined number of rows of bales, constituting a layer of bales, have been positioned on the table 32, the forward end 244 of the table 32 will be raised, thereby moving the layer of bales onto the rack 34. This process of moving layers of bales from the table 32 to the rack 34 will be repeated until a predetermined number of layers of bales constituting a stack of bales, have been positioned on the rack 34.

The stack of bales on the rack 34 may thus be transported to an area where the stack of bales is to be located for storage or other such purposes. To unload the stack of bales from the rack 34, the rack 34 is tilted from a horizontal position to a position generally perpendicular to the bale wagon 20 as shown in FIG. 9. The bale wagon 20 is then pulled away from the stack of bales. The stack of bales, having been unloaded, the rack 34 is then activated and moved to its original position on the bale wagon 20; thus the bale wagon 20 is once again in position to pick up more bales from a field.

A bale wagon generally capable of performing the above-mentioned functions is available as previously mentioned, and therefore no further detailed description is required herein. The following detailed description of the operation of a bale wagon 20 is limited to the banding assembly 36 and the stack retrieving assembly 38, which constitute the improvements contemplated by the present invention.

OPERATION OF BANDING ASSEMBLY

Prior to picking up the bales from a field, the twine 48 of the banding assembly 36 is positioned about the table 32, as previously described. Since the twine 48 is extended generally under the table 32 near the front end 244 thereof, this portion of the twine 48 will not interfere with the rows of bales as they are moved onto the table 32 from the conveyor type platform 30. The twine tension plate 43 and the twine guide 44 are positioned and adjusted to hold that portion of the twine 48 extending diagonally across the table 32 (FIG. 1) at a level above the table, whereby the twine 48 will engage the first row of bales loaded on the table 32.

The various rows of bales are moved onto the table 32 from the conveyor-type platform 30 and each subsequent row of bales will move the preceeding row of bales further back along the table 32 toward the rear end 246 thereof. As the rows of bales move back along the table 32, a portion thereof will engage that portion of the twine 48 which extends generally diagonally across the table 32. The twine tension plate 43 will hold the twine 48 tautly about the rows of bales, thereby retaining the twine 48 in position with respect to the rows of bales, but is positioned loosely enough to allow an additional length of the twine 48 to be extended from the twine canister 42 to compensate for the rows of bales being moved thereon.

After a layer of bales has been positioned on the table 32, that portion of the twine 48 which extends generally under the table 32 between the twine guides 44 and 46, is lifted above the table 32 and generally positioned about the layer of bales thereon. The twine 48 will then be positioned about the layer of bales as shown in FIG. 14, each bale being designated by the general reference character 302.

In this position, an additional portion of the twine 48 is removed from the twine canister 42 and extended along the rear end 246 and the sides 250 of the table 32. This portion of the twine, which is designated in FIG. 14 by the reference character 48a and shown in dashed lines therein, is then extended to the jaw assembly 144 of the twine binder assembly 40. The twine 48a is then generally disposed in the groove 156 of the jaw assembly 144, and the handle 158 is moved, such that the gripping surface 160 thereof is moved into engagement with the twine 48a, thereby securely holding twine 48a therebetween. The excess portion of the twine 48a extending beyond the jaw assembly 144 is then cut using the twine cutter 62 (FIG. 3) of the twine binder assembly 40, and is returned to the twine canister 42. A sufficient length of the twine 48a should be retained so that it may be tied to the opposite end of the twine 48, as will be described. It is apparent that in this position, the twine 48 is extended generally about the layer of bales on the table 32 and has one end thereof secured in the jaw assembly 146 and the opposite end thereof designated 48a secured in the jaw assembly 144.

The jaw assembly 144, which holds the twine 48a, is then slid along the slide rail 118 (FIGS. 5 and 6) by rotating the handle 100 of the winch assembly 66, thereby retrieving the cable 170 and sliding the jaw assembly 144 toward the end 122 of the slide rail 118. As the jaw assembly 144 is slid along the slide rail 118 toward the end 122 thereof, it is apparent that the twine 48 is drawn tautly about the layer of bales disposed on the table 32. When the twine 48 has been drawn sufficiently taut about the layer of bales, the screw 142 on the retainer 140 is secured in position against the slide rail 118, thereby securely holding the jaw assembly 144 in position on the slide rail 118.

In another form, the winch assembly 66 could be provided with a locking mechanism such that the gear wheels 84 and 102 would rotate only in one direction, thereby preventing the cable winder 74 from unwinding the cable 170 when the jaw assembly 144 has been positioned on the slide rail 118. The locking mechanism should of course be provided such that is may be released allowing the cable winder 74 to unwind the cable 170, when resetting the twine binder assembly 40.

The loose ends of the twine 48 and 48a extending from the jaw assemblies 144 and 146 respectively, are then securely tied to each other. After the ends have thus been tied, the twine 48 is then released from the respective jaw assembly 146 and 144, by moving each handle 158 thereof. After the twine 48 has been released from the jaw assemblies 144 and 146, it is apparent that the layer of bales on the table 32 will be securely held in position by the twine 48, which now extends around the outer periphery of the layer of bales disposed on the table 32.

Each layer of bales is then of course moved to the rack 34 and positioned thereon until the requisite number of layers of bales constituting a stack of bales have been positioned on the rack 34. The stack of bales on the rack 34 may then be transported and unloaded in a manner as previously described. Since each layer of bales in the stack of bales is securely held by the twine 48, when the stack of bales is ultimately unloaded the stack of bales will be more securely held in position, thereby compensating for certain irregularities in the terrain and certain inconsistencies in the bales such as size, weight and looseness, and thus providing a more stable and secure stack of bales. In many cases, as where the bales are relatively consistent and the area on which the bales are stored is relatively level, it is necessary to band only one of the layers of bales in a stack to obtain the desired stability.

When the twine binder assembly 40 is not in use, the linkage 190 (FIGS. 5 and 6) may be removed from engagement with the leg 54 of the U-shaped frame 50 by first removing the nut 194. After the linkage 190 is so removed, the U-shaped frame 50 will be free to rotate or swivel about the connection between legs 54 and 56 and the supporting members 174 and 176, respectively. The twine binder assembly 40 may thus be rotated to a position under the frame 22 and thus to a position where it will not interfere with any subsequent operations.

BALE RETRIEVING

When it is desired to use the bale wagon 20 to pick up a stack of bales from a storage area, each track assembly 262 of the stack-retrieving assembly 38 is positioned with respect to the stack of bales as shown in FIGS. 9 and 10. Each bale in the stack of bales shown in FIGS. 9 and 10 is also designated by the reference character 302. The end 280 of each track assembly 262 is positioned adjacent the stack of bales, which is to be retrieved, and the track assemblies 262 are positioned a distance apart to accommodate the wheels 24 of the bale wagon 20.

Once each track assembly 262 is in proper position with respect to the stack of bales, the positioning pin 296 (FIG. 11) is extended through the hollow shaft 294 and into the lower portion of the stack of bales, thereby holding each track assembly 262 securely in position relative to the stack of bales. Each post member 288 (FIG. 13) on each track assembly 262 is positioned and disposed to extend into the terrain, and will also tend to hold each track assembly 262 securely in position with respect to the stack of bales as the stack of bales is being retrieved.

The rack 34 is then swung to a position generally perpendicular to the frame 22, as shown in FIGS. 9 and 10. In this position, the tines 260 are in position to be slid under the stack of bales to be retrieved. One end of each cable 272 is secured to the respective bracket 290 of the respective support member 276, the opposite end of the cable 272 being secured to end of the shaft 300 of the respective hydraulic cylinder 264, and the intermediate portion of the cable being threaded around the respective pulleys 266, 270 and 268 as previously described. As shown in FIGS. 9 and 10, the bale wagon 20 has been positioned such that the wheels 24 of the bale wagon 20 are in engagement with the wire mesh grids 286 of the track assemblies 262.

The gears of a bale wagon 20 are placed in neutral and the brake is released. Each hydraulic cylinder means 264 is then actuated, thereby retrieving the shaft 300 thereof, and also retrieving each cable 272 toward its respective hydraulic cylinder 264. As the shafts 300 are retrieved, it is apparent that the cables 272 will pull the bale wagon 20 generally toward the stack of bales, the tines 260 being moved generally under the stack of bales.

After the bale wagon 20 has been moved along the track assemblies 262 to a position wherein the rack 34 is adjacent the stack of bales, the tines 260 on the rack 34 will be extended lengthwise under the stack of bales. The rack 34 is then swung back to a position adjacent the frame 22 of the bale wagon 20 and the tines 260 will lift the stack of bales. In this position, the stack of bales may be transported to other areas.

It is apparent that when retrieving a stack of bales using the stack-retrieving assembly 38, the wheels 24 of the bale wagon 20 will move along the wire mesh grids 286. The wire mesh grids 286 will therefore provide sufficient traction or footing for the wheels 24 and thereby virtually eliminate slippage, notwithstanding the condition of the terrain in the area in which the bale wagon 20 is being used.

It has been found that having the tines 260 generally cylindrically shaped with a conically shaped end 274 thereon, will allow the tines 260 to be slipped under the stack of bales and prevent the tines 260 from digging into the terrain or the stack of bales. It has also been found that this particular shape of tines 260 will leave an impression on the bales when the stack of bales is unloaded from the bale wagon 20, thus facilitating the insertion of the tines 260 under the stack of bales when retrieving same.

It should also be noted that since the stack of bales has been securely positioned together as described hereinbefore, the retrieving of the stack of bales is much more efficient and positive, virtually eliminating the hazards generally encountered when trying to move an unsecure or loose stack of bales.

It is therefore apparent from the foregoing, that a bale wagon, having the improvements described hereinbefore, will provide a more secure stack of bales and a much more efficient and effective apparatus for retrieving same.

The improvements described herein also eliminate much of the operator skill, labor and time previously required and yet produce a more secure and stable stack of bales.

Changes may be made in the construction and arrangement of parts or elements as disclosed herein without departing from the spirit and scope of the invention.

I claim:

1. In a bale wagon employed for stacking, loading or unloading bales of hay and the like and which includes a table, on which the bales are loaded in rows and moved from the front to the rear of the table to form a layer of bales on the table, and a rack onto which layers of the bales are moved from the table to form a stack of the bales on the rack, the improvement comprising:
   a supply of twine carried on the wagon adjacent the table;
   means on the wagon for extending the twine around a layer of bales on the table as the bales are loaded on the table;
   twine binder means on the bale wagon adjacent the table for tensioning the twine around a layer of bales on the table, whereby the bales and the layer may be tightly bound together before being loaded on the rack;
   a plurality of tines secured in spaced relation on one end of the rack and positioned to be moved under a stack of bales being loaded on the wagon;
   guide means adapted to be positioned for supporting the wagon and guiding the wagon toward a stack of bales to be loaded on the wagon;
   a retrieving means supported on the bale wagon; and
   cable means secured between the guide means and the retrieving means for pulling the wagon on the guide means toward a stack of bales and forcing the tines under the stack upon actuation of the retrieving means.

2. The bale wagon of claim 1 wherein the means for extending the twine around the layer of bales is defined further to include:
   a first guide eyelet means secured to one side portion of the frame of the bale wagon, said first guide eyelet means adapted to receive a portion of the twine extending from said supply of twine and to position the twine with respect to said table; and
   a second guide eyelet means secured to the opposite side portion of the frame of the bale wagon, said second guide eyelet means adapted to receive a portion of the twine extending from the first guide eyelet means and to position the twine with respect to said table.

3. The bale wagon of claim 1 wherein the means for extending the twine around the layer of bales is defined further to include:
   a twine tension means secured to a portion of the frame of the bale wagon, said twine tension means adapted to receive a portion of the twine means from the supply of twine and to tensionally hold said twine means therein generally above said table;
   a first guide eyelet means secured to one side portion of the frame of the bale wagon, said first guide eyelet means adapted to receive a portion of the twine extending from the twine tension means and to position the twine with respect to said table; and
   a second guide eyelet means secured to one side portion of the frame of the bale wagon, said second guide eyelet means adapted to receive a portion of the twine extending from the first guide eyelet means and to position the twine with respect to said table.

4. The bale wagon of claim 3 wherein the twine tension means is disposed generally near the rear and near one side portion of said table and the first guide eyelet means is disposed generally near the front and near the opposite side portion of said table, such that the twine extending from the twine tension means to the first guide eyelet means extends generally diagonally across the said table.

5. The bale wagon of claim 4 wherein the twine tension means and the first guide eyelet means are disposed and adapted to position the twine extending therebetween a distance above the table approximately equal to one-half the height of the bales as they are positioned on said table.

6. The bale wagon of claim 4 wherein the second guide eyelet means is disposed generally near the front of said table and generally near a side portion of said table opposite the first guide eyelet means, said first guide eyelet means and said second guide eyelet means adapted such that the twine extending therebetween extends generally under said table, so that as a row of bales is moved onto said table, the row of bales will not contact the twine extending between the first guide eyelet means and the second guide eyelet means.

7. The bale wagon of claim 6 wherein the twine binder means is disposed on the bale wagon generally near the same side portion of said table as the second guide eyelet means.

8. The bale wagon of claim 7 wherein the twine binder means is characterized further to include:
   a frame means secured to the frame of the bale wagon;
   a slide rail means secured to a portion of the frame means;
   a first jaw means secured to one end portion of the slide rail means and adapted to receive and securely hold a portion of the twine extending from the second guide eyelet means;
   a second jaw means slidingly disposed on the slide rail means and adapted to receive and securely hold a portion of the twine extending from the supply of twine; and
   a winch means adapted to slide the second jaw means along the slide rail means toward the first jaw means, thereby tensioning the twine about the layer of bales on the table.

9. The bale wagon of claim 1 wherein the tines have a generally circular shaped cross section.

10. The bale wagon of claim 9 wherein the outermost end of each tine, with respect to the rack, is conically shaped.

11. The bale wagon of claim 1 wherein the guide means is characterized further to include a pair of track assemblies, each track assembly comprising:
   support means sized to accommodate the wheels of the bale wagon; and
   wire mesh grid means secured to the upper side portion of the support means, to provide traction for the wheels of the bale wagon as the bale wagon is pulled toward the stack of bales.

12. The bale wagon of claim 1 wherein the retrieving means is a cylinder means, having a shaft reciprocating therein as the cylinder means is actuated, and wherein one end of the cable means is secured to the shaft of the cylinder means.

13. In a bale wagon employed for stacking, loading and unloading bales of hay and the like and which includes a table on which the bales are loaded in rows and moved from the front to the rear of the table to form a layer of bales on the table, the improvement comprising:
a supply of twine carried on the wagon adjacent the table;
means on the wagon for extending the twine around a layer of bales on the table as the bales are loaded on the table; and
twine binder means on the bale wagon adjacent the table for tensioning the twine around a layer of bales on the table, whereby the bales in the layer may be tightly bound together before being unloaded from the table.

14. The bale wagon of claim 13 wherein the means for extending the twine around the layer of bales is defined further to include:
a first guide eyelet means secured to one side portion of the frame of the bale wagon, said first guide eyelet means adapted to receive a portion of the twine extending from said supply of twine and to position the twine with respect to said table; and
a second guide eyelet means secured to one side portion of the frame of the bale wagon, said second guide eyelet means adapted to receive a portion of the twine extending from the first guide eyelet means and to position the twine with respect to said table.

15. The bale wagon of claim 13 wherein the means for extending the twine around the layer of bales is defined further to include:
a twine tension means secured to a portion of the frame of the bale wagon, said twine tension means adapted to receive a portion of the twine means from the supply of twine and to tensionally hold said twine means therein generally above said table;
a first guide eyelet means secured to one side portion of the frame of the bale wagon, said first guide eyelet means adapted to receive a portion of the twine extending from the twine tension means and to position the twine with respect to said table; and
a second guide eyelet means secured to one side portion of the frame of the bale wagon, said second guide eyelet means adapted to receive a portion of the twine extending from the first guide eyelet means and to position the twine with respect to said table.

16. The bale wagon of claim 15 wherein the twine tension means is disposed generally near the rear and near one side portion of said table and the first guide eyelet means is disposed generally near the front and near the opposite side portion of said table, such that the twine extending from the twine tension means to the first guide eyelet means extends generally diagonally across said table.

17. The bale wagon of claim 16 wherein the twine tension means and the first guide eyelet means are disposed and adapted to position the twine extending therebetween a distance above the table approximately equal to one-half the height of the bales as they are positioned on said table.

18. The bale wagon of claim 16 wherein the second guide eyelet means is disposed generally near the front of said table and generally near a side portion of said table opposite the first guide eyelet means, said first guide eyelet means and said second guide eyelet means adapted such that the twine extending therebetween extends generally under said table, so that as a row of bales is moved onto said table, the row of bales will not contact the twine extending between the first guide eyelet means and the second guide eyelet means.

19. The bale wagon of claim 16 wherein the twine tension means includes:
a bracket support means secured to the frame of the bale wagon;
a plate means disposed such that one surface thereof generally faces a portion of the surface of the bracket support means, said twine being generally disposed between the bracket support means and the plate means;
a bolt means extending through a portion of the plate means and secured on one end thereof to the bracket support means; and
a spring means disposed on the bolt means between the plate means and one end of the bolt means, said spring means being sized and disposed to bias the plate means generally toward engagement with the bracket support means, thereby tensionally holding the twine between the bracket support means and the plate means.

20. The bale wagon of claim 18 wherein the first guide eyelet means includes:
an L-shaped support member, having a first and second leg member, said first leg member being adapted to be secured to the frame of the bale wagon and said second leg member extending generally a distance above the table; and
a pair of guide eyelets secured to the second leg member of the L-shaped support member, one of said guide eyelets being secured near the upper end of said second leg member, and one of said guide eyelets being secured generally near the lower end portion of said second leg member.

21. The bale wagon of claim 18 wherein the first guide eyelet means and the second guide eyelet means each includes:
an L-shaped support member having a first and second leg member, said first leg member being adapted to be secured to the frame of the bale wagon and said second leg member extending generally a distance above the table; and
a pair of guide eyelets secured to the second leg member of the L-shaped support member, one of said guide eyelets being secured near the upper end of said second leg member and one of said guide eyelets being secured generally near the lower end portion of said second leg member.

22. The bale wagon of claim 18 wherein first guide eyelet means includes:
an L-shaped support member, having a first and second leg member, each leg member having a hollow end portion therein, the end of the first leg member opposite the hollow end portion thereof is secured to a lower end portion of the second leg member opposite the hollow end portion of the second leg member, and the first leg member extends generally perpendicular to the second leg member;
an arm member slidingly disposed in the hollow end portion of the first leg member and adapted on the opposite end thereof to be secured to the frame of the bale wagon, thereby allowing the distance which the L-shaped support member is disposed with respect to the frame of the bale wagon to be adjustable, depending on the distance which the arm member extends into the hollow end portion of the first leg member;
a screw means extending through the first leg member and sized and disposed to contact the arm member in one position thereof, thereby securing the arm member in position with respect to the first leg member;
a post member slidingly disposed in the hollow end portion of the second leg member, thereby allowing the distance which the post member extends above the table to be adjustable depending on the distance which the post member extends into the hollow end portion of the second leg member;
a screw means extending through the second leg member and sized and disposed to contact the post member, in one position thereof, thereby securing the post member in position with respect to the second leg member; and a pair of guide eyelets, one of said guide eyelet being secured to the post member and the other of said guide eyelets being secured to the second leg member generally near the lower end portion thereof.

23. The bale wagon of claim 18 wherein the first guide eyelet means and the second guide eyelet means, each includes:
- an L-shaped support member, having a first and second leg member, each leg member having a hollow end portion therein, the end of the first leg member opposite the hollow end portion thereof is secured to a lower end portion of the second leg member opposite the hollow end portion of the second leg member, and the first leg member extends generally perpendicular to the second leg member;
- an arm member slidingly disposed in the hollow end portion of the first leg member, and adapted on the opposite end thereof to be secured to the frame of the bale wagon, thereby allowing the distance which the L-shaped support member is disposed with respect to the frame of the bale wagon to be adjustable, depending on the distance which the arm member extends into the hollow end portion of the first leg member;
- a screw means which extends through the first leg member and is sized and disposed to contact the arm member in one position thereof, thereby securing the arm member in position with respect to the first leg member;
- a post member, slidingly disposed in the hollow end portion of the second leg member, thereby allowing the distance which the post member extends above the table to be adjustable depending on the distance which the post member extends into the hollow end portion of the second leg member;
- a screw means extending through the second leg member and sized and disposed to contact the post member in one position thereof, thereby securing the post member in position with respect to the second leg member; and
- a pair of guide eyelets, one of said guide eyelets being secured to the post member and the other of said guide eyelets being secured to the second leg member generally near the lower end portion thereof.

24. The bale wagon of claim 18 wherein the twine binder means is disposed on the bale wagon generally near the same side portion of said table as the second guide eyelet means.

25. The bale wagon of claim 24 wherein the twine binder means is characterized further to include:
- a frame means secured to the frame of the bale wagon;
- a slide rail means secured to a portion of the frame means;
- a first jaw means secured to one end portion of the slide rail means and adapted to receive and securely hold a portion of the twine extending from the second guide eyelet means;
- a second jaw means slidingly disposed on the slide rail means and adapted to receive and securely hold a portion of the twine extending from the supply of twine; and
- means adapted to slide the second jaw means along the slide rail means toward the first jaw means, thereby tensioning the twine about the layer of bales on the table.

26. The bale wagon of claim 25 wherein the second jaw means includes means to secure the second jaw means in position on the slide rail means when the second jaw means has been slid to a position tensioning the twine about the layer of bales.

27. The bale wagon of claim 26 wherein the means to slide the second jaw means along the slide rail means is characterized further to include:
- a pulley rotatingly secured to the slide rail means;
- a winch means secured to the frame of the twine binder means;
- a cable secured on one end to the second jaw means and secured on opposite end thereof to the winch means and in rotating engagement with the pulley, such that as the winch means is rotated in one direction the cable is retrieved, thereby pulling the second jaw means along the slide rail means generally toward the first jaw means and tensioning the twine about the layer of bales.